(12) United States Patent
Jain

(10) Patent No.: US 10,637,274 B1
(45) Date of Patent: Apr. 28, 2020

(54) WIRELESS CHARGING COIL ASSEMBLY

(71) Applicant: Microsoft Technology Licensing, LLC, Redmond, WA (US)

(72) Inventor: Sidharath Jain, Belleview, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/175,581

(22) Filed: Oct. 30, 2018

(51) Int. Cl.
*H02J 7/00* (2006.01)
*H02J 7/02* (2016.01)
*H01F 38/14* (2006.01)
*G06F 3/0354* (2013.01)

(52) U.S. Cl.
CPC ............ *H02J 7/025* (2013.01); *H01F 38/14* (2013.01); *G06F 3/03545* (2013.01)

(58) Field of Classification Search
CPC ..... H02J 7/00; H02J 7/02; H02J 7/025; H01F 38/14; G06F 3/03545; G06F 3/0354
See application file for complete search history.

(56) References Cited

U.S. PATENT DOCUMENTS

| | | | |
|---|---|---|---|
| 8,890,471 B2 | 11/2014 | Chen | |
| 8,947,379 B2 | 2/2015 | Bakken et al. | |
| 9,252,628 B2 | 2/2016 | Leabman et al. | |
| 9,728,329 B2 | 8/2017 | Walsh | |
| 2011/0241607 A1 | 10/2011 | Wiegers | |
| 2012/0235636 A1* | 9/2012 | Partovi | ............... H02J 50/12 320/108 |
| 2013/0093388 A1 | 4/2013 | Partovi | |
| 2013/0207472 A1 | 8/2013 | Chiang | |
| 2015/0214620 A1 | 7/2015 | Yosui | |

(Continued)

FOREIGN PATENT DOCUMENTS

| | | |
|---|---|---|
| CN | 204885446 U | 12/2015 |
| EP | 3131208 A1 | 2/2017 |

(Continued)

OTHER PUBLICATIONS

"CC-Show Qi Wireless Charger Mat, Portable Cordless 2-Port USB Hub Wireless Charging Pad Stand for iPhone X/8/8 Plus, Samsung Galaxy S9, S8+/S8 Plus, Android, All Qi-Enabled Devices—(Black)", Retrieved from: https://www.amazon.com/CC-Show-Wireless-Portable-Cordless-Qi-Enabled/dp/B078W6ZCMM, Retrieved Date: Sep. 11, 2018, 13 Pages.

(Continued)

*Primary Examiner* — Vuthe Siek
(74) *Attorney, Agent, or Firm* — Holzer Patel Drennan

(57) ABSTRACT

The disclosed technology provides an electronic device including a metal casing surrounding the electronic device. The metal casing has a first aperture including at least two sub-apertures connected by a channel. The metal casing also has a first surface on a charging target side of the metal casing and a second surface on a charging source side of the metal casing. The electronic device also includes a wireless charging coil located on the charging source side of the metal casing of the electronic device. The wireless charging coil is supplied with current from a power source. The current flowing through the wireless charging coil induces a surface current in the metal casing surrounding the electronic device. The current flowing through the wireless charging coil and the surface current cause a combined magnetic field.

20 Claims, 8 Drawing Sheets

(56) References Cited

U.S. PATENT DOCUMENTS

| | | | |
|---|---|---|---|
| 2016/0056664 A1* | 2/2016 | Partovi | H04B 5/0081 |
| | | | 307/104 |
| 2016/0179140 A1 | 6/2016 | Yang et al. | |
| 2016/0181857 A1 | 6/2016 | Konanur et al. | |
| 2017/0098951 A1* | 4/2017 | Olgun | H02J 7/025 |
| 2017/0338684 A1 | 11/2017 | Mishriki et al. | |
| 2018/0107913 A1 | 4/2018 | Shi | |
| 2018/0241255 A1 | 8/2018 | Leabman | |

FOREIGN PATENT DOCUMENTS

| | | |
|---|---|---|
| EP | 3327863 A1 | 5/2018 |
| WO | 2013122565 A1 | 8/2013 |
| WO | 2015067854 A1 | 5/2015 |
| WO | 2017135554 A1 | 8/2017 |

OTHER PUBLICATIONS

"International Search Report and Written Opinion Issued in PCT Application No. PCT/US2019/057110", dated Jan. 28, 2020, 12 Pages.

* cited by examiner

WIRELESS CHARGING COIL ASSEMBLY

BACKGROUND

Inductive charging using wireless charging coils is a desirable way to charge peripheral devices. However, computing devices, such as tablets, are becoming smaller and thinner. When there is a need to charge accessories from the main device it may be difficult to incorporate conventional wireless charging coils into the design of a smaller, thinner computing device.

SUMMARY

In at least one implementation, the disclosed technology provides an electronic device including a metal casing surrounding the electronic device. The metal casing has a first aperture including at least two sub-apertures connected by a channel. The metal casing also has a first surface on a charging target side of the metal casing and a second surface on a charging source side of the metal casing. The electronic device also includes a wireless charging coil located on the charging source side of the metal casing of the electronic device. The wireless charging coil is supplied with current from a power source. The current flowing through the wireless charging coil induces a surface current in the metal casing surrounding the electronic device. The current flowing through the wireless charging coil and the surface current cause a combined magnetic field.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
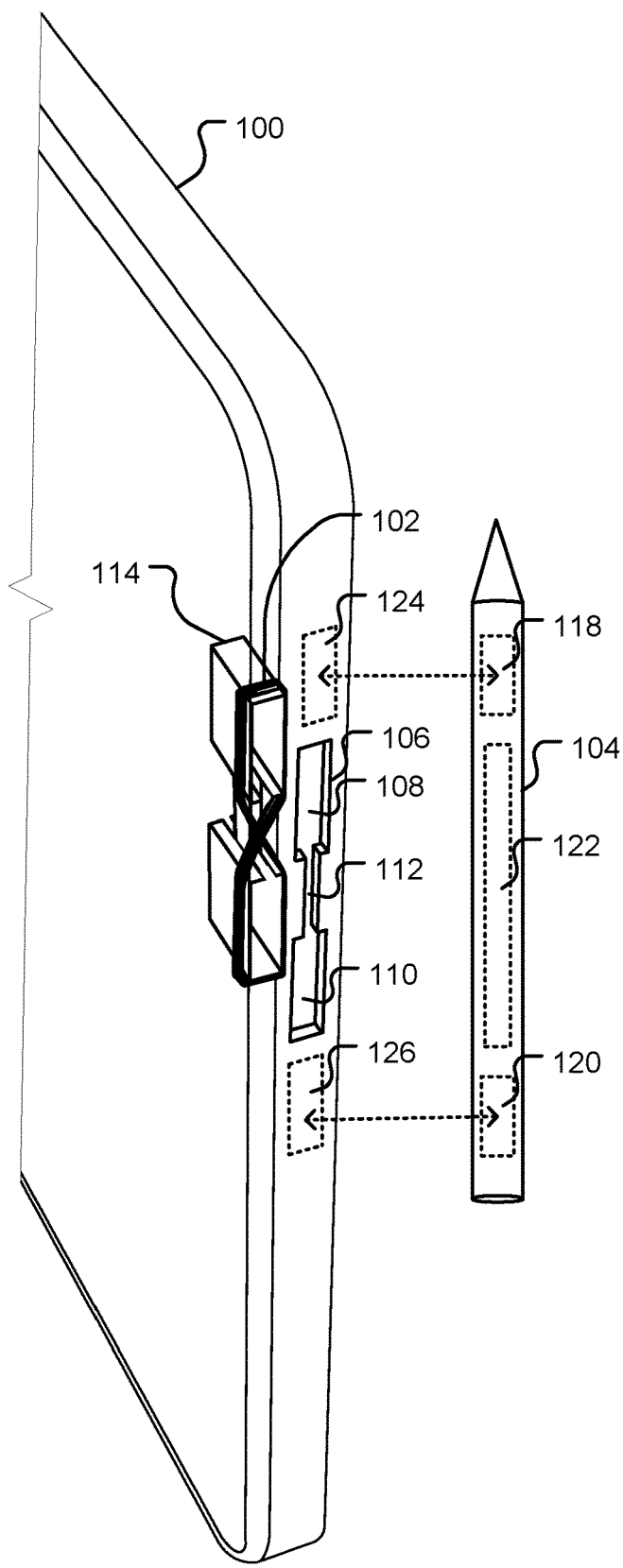
FIG. 1 illustrates an example computing device with a wireless charging coil located on an edge of the computing device that may be used to charge a target electronic device.

FIG. 1 illustrates an example computing device 100 with a wireless charging coil 102 located on an edge of the computing device 100 that may be used to charge a target electronic device 104. The wireless charging coil 102 may be used to charge batteries in a variety of target electronic devices. For example, in FIG. 1, the target electronic device 104 is an electronic stylus. In other implementations, the target electronic device 104 may be a different peripheral device. The target electronic device 104 may have attachment mechanisms 118 and 120 and a rechargeable battery, coil, and associated circuitry 122. In one implementation, the attachment mechanisms 118 and 120 are magnets. The attachment mechnism 118 on the target electronic device 104 corresponds with an attachment mechanism 124 on the computing device 100. The magnet 120 on the target electronic device 104 corresponds with an attachment mechanism 126 on the computing device 100. When the target electronic device 104 is attached to the computing device 100 by the attachment mechanisms 118 and 120, the rechargeable battery, coil, and associated circuitry 122 on the target electronic device 104 may be recharged by proximity to the wireless charging coil 102.

The wireless charging coil 102 is located on a charging source side of a metal casing of the computing device 100 and is aligned with an aperture 106 in the metal casing of the computing device 100. In the implementation shown in FIG. 1, the aperture 106 is shown on the edge of the computing device 100 and is shown providing access to ports in the computing device 100, such as universal serial bus (USB) ports. In other implementations, the aperture 106 may be located on another portion of the computing device 100, such as on the top, bottom, or back side of the computing device 100. Further, the aperture 106 may be any aperture in the metal casing of the computing device 100, such as an aperture providing access to ports or an aperture for ventilation of the computing device 100.

The aperture 106 is shaped by a sub-aperture 108 and a sub-aperture 110 connected by a channel 112. The sub-aperture 108 and the sub-aperture 110 each provide access to a port of the computing device 110. In some implementations, the sub-aperture 108 and the sub-aperture 110 may be the same size. In other implementations, the sub-aperture 108 and the sub-aperture 110 may be different sizes. The sub-aperture 108 and the sub-aperture 110 are connected by the channel 112 so that the aperture 106 is one continuous aperture in the metal casing of the computing device 100. The purpose of the channel 112 is discussed in more detail with respect to FIG. 4.

In some implementations, the aperture 106 is aligned with a shield 114. The shield 114 may provide shielding for the ports accessed through the aperture 106. In some implementations, the wireless charging coil 102 is wrapped around the shield 114. In other implementations, the wireless charging coil 102 may be located between the shield 114 and the metal casing of the electronic device 100. The wireless charging coil 102 is placed relative to the shield 114 so that the wireless charging coil 102 does not prevent access to the ports in the computing device accessed through the aperture 106. Further, the wireless charging coil 102 is located close enough to the metal casing of the computing device 100 for wireless charging to be effective. For example, the wireless charging coil 102 may be located at a distance of less than about 1 mm from the metal casing of the computing device 100. The wireless charging coil 102 may also be in contact with the metal casing of the computing device 100 through an insulation layer (not shown).

The wireless charging coil 102 may be supplied with current by a power source located in the computing device 100. When the wireless charging coil 102 is supplied with current, a surface current is induced on the metal casing of the computing device 100 around the aperture 106. The current flowing through the charging coil 102 causes a magnetic field that flows outwardly from the computing device 100. The surface current on the metal casing of the computing device 100 around the aperture 106 also causes a magnetic field flowing outwardly from the computing device. The magnetic field caused by the current flowing through the charging coil 102 and the magnetic field caused by the surface current on the metal casing of the computing device 100 around the aperture 106 additively combine to create a combined magnetic field. The combined magnetic field is discussed in more detail with respect to FIG. 4.

The combined magnetic field extends beyond the metal casing of the computing device 100 and, accordingly, provides wireless charging to the target electronic device 104. When the target electronic device 104 is secured to the computing device 100 such that the coil on the device 100 and a similar sized coil in the target electronic device 104 align and the combined magnetic field couples with the similar sized coil located in the target electronic device 104. The power coupled from the source coil to the receiver coil can charge the rechargeable battery 122 of the target electronic device 104. In some implementations, the wireless charging coil 102 only provides wireless charging when the ports accessed through the aperture 106 are not in use. In some implementations, the device may support both wireless charging of the target electronic device 104 using the wireless charging coil 102 and near field communication (NFC) capabilities. For example, when a wireless charging frequency is same as an NFC frequency the same antenna assembly and circuitry can be used for both wireless charging and NFC in reader, card or peer to peer mode.

Figure 2:
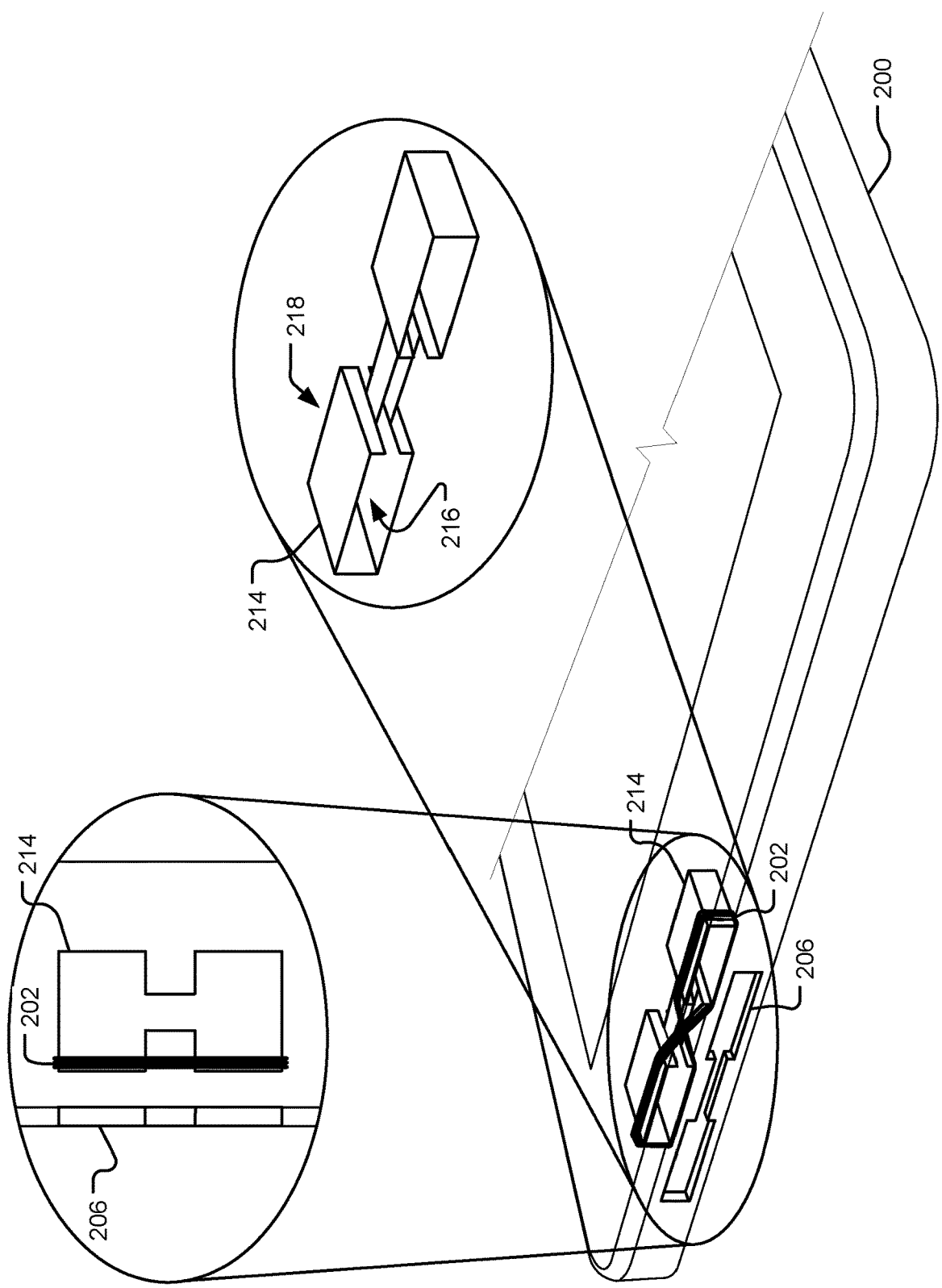
FIG. 2 illustrates an example computing device with a wireless charging coil.

FIG. 2 illustrates an example computing device 200 with a wireless charging coil 202. The computing device 200 is surrounded by a metal casing with an aperture 206 in the metal casing. As shown in FIG. 2, the aperture 206 provides access to two ports of the computing device 200. A shield 214 provides shielding for the ports accessed through the aperture 206. The shield 214 is formed from two open shields connected by a channel. In one implementation, an open shield is a shield with open ends, through all sides of the shield. For example, the shield 214 is open on a front side indicated by an arrow 216 and is open on the back side indicated by an arrow 218. An inner side of the shield 214 is also partially open. In some implementations, both the inner side and an outer side of the shield 214 are partially open. In some implementations, the shield 214 is formed by two open shields, as discussed further with respect to FIG. 8.

The aperture 206 includes two sub-apertures connected by a channel, where each of the sub-apertures provide access to one port in the computing device 200. The channel goes completely through the metal casing of the computing device 200 such that the aperture 206 is a complete aperture through the metal casing of the computing device 200.

In the implementation shown in FIG. 2, the wireless charging coil 202 is wrapped around the shield 214 of the electronic device 200. Accordingly, the wireless charging coil 202 is closely aligned with the perimeter of the aperture 206. This allows the wireless charging coil 202 to couple with the aperture 206 when current flows through the wireless charging coil 202. Additionally, the wireless charging coil 202 is located such that it does couple with the aperture 206 when current flows through the wireless charging coil 202. The exact distance of the wireless charging coil 202 from the metal casing of the computing device 200 is dependent upon the particular design. In one implementation, for example, the wireless charging coil 202 is located at a distance of less than 1 mm from the metal casing of the computing device 200. The wireless charging coil 202 may be supplied by a power source (not shown) in the computing device that only powers the wireless charging coil 202. In another implementation, the power source may be shared with other components of the computing device 200.

When current flows through the wireless charging coil 202, the wireless charging coil 202 couples with the aperture 206 in the metal casing of the computing device 200. The current flowing through the wireless charging coil 202 induces a surface current in the metal casing of the computing device 200. The current flowing through the wireless charging coil 202 causes a first magnetic field that additively combines with a second magnetic field caused by the surface current in the metal casing of the computing device 200.

When the power source supplies current to the wireless charging coil 202, the wireless charging coil 202 couples with the aperture 206 in the metal casing of the computing device. This coupling induces a surface current on the metal casing of the computing device 200 around the aperture 206. The induced surface current flowing around the aperture 206 takes the form of current loops centered around each of the sub-apertures of the aperture 206. Notably, the current flowing through the wireless charging coil 202 and the induced surface current flowing around the aperture 206 flow in the same direction.

The current flowing through the wireless charging coil 202 and the induced surface current flowing around the aperture 206 each cause a magnetic field perpendicular to the current flow. The magnetic field caused by the current flowing through the wireless charging coil 202 and the magnetic field caused by the induced surface current flowing around the aperture 206 are each disc shaped and go in the same direction. As a result, the magnetic field caused by the current flowing through the wireless charging coil 202 and the magnetic field caused by the induced surface current flowing around the aperture 206 additively combine to form a combined magnetic field. The combined magnetic field is also disc shaped and extends away from the computing device 200. The combined magnetic field may be used to charge the target electronic device located on the charging target side of the metal casing of the computing device 200. The combined magnetic field is discussed in more detail with respect to FIG. 4.

Figure 3:
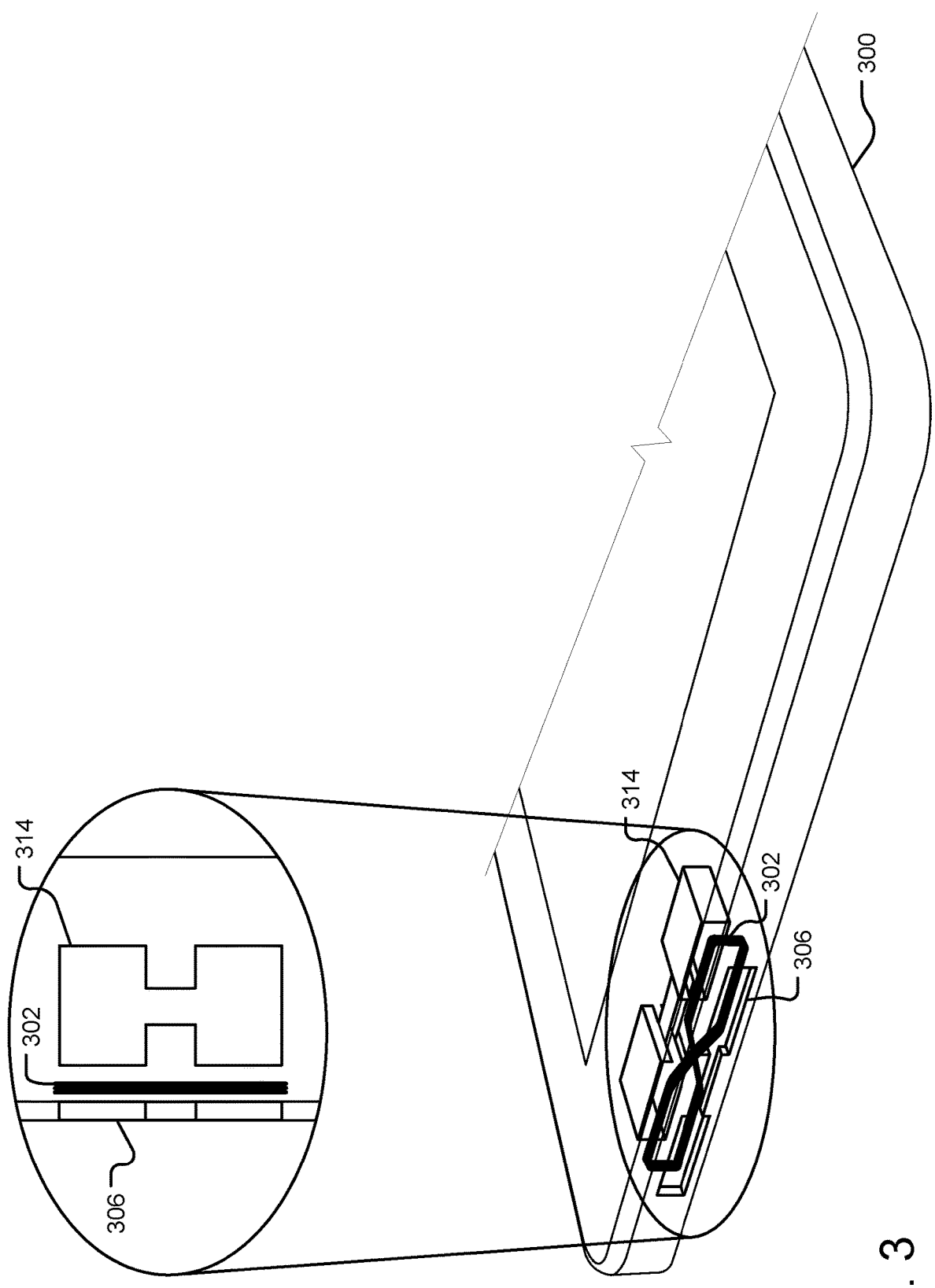
FIG. 3 illustrates an example computing device with a wireless charging coil.

FIG. 3 illustrates an example computing device 300 with a wireless charging coil 302. The computing device 300 is surrounded by a metal casing with an aperture 306 in the metal casing. As shown in FIG. 3, the aperture 306 provides access to two ports of the computing device 300. A shield 314 provides shielding for the ports accessed through the aperture 306. The aperture 306 includes two sub-apertures connected by a channel, where each of the sub-apertures provide access to one port in the computing device 300. The channel goes completely through the metal casing of the computing device 300 such that the aperture 306 is a complete aperture through the metal casing of the computing device 300.

In the implementation shown in FIG. 3, the wireless charging coil 302 is located between the shield 314 and the aperture 306 in the metal casing of the computing device 300. The wireless charging coil 302 is also closely aligned with the perimeter of the aperture 306 such that the wireless charging coil 302 does not interfere with use of the ports accessed through the aperture 306. This alignment allows the wireless charging coil 302 to couple with the aperture 306 when current flows through the wireless charging coil 302. Additionally, the wireless charging coil 302 is located such that it does couple with the aperture 306 when current flows through the wireless charging coil 302. The exact distance of the wireless charging coil 302 from the metal casing of the computing device 300 is dependent upon the particular design. In one implementation, for example, the wireless charging coil 302 is located at a distance of less than 1 mm from the metal casing of the computing device 300. The wireless charging coil 302 may be supplied by a power source (not shown) in the computing device that only powers the wireless charging coil 302. In another implementation, the power source may be shared with other components of the computing device 300.

When current flows through the wireless charging coil 302, the wireless charging coil 302 couples with the aperture 306 in the metal casing of the computing device 300. The current flowing through the wireless charging coil 302 induces a surface current in the metal casing of the computing device 300. The current flowing through the wireless charging coil 302 causes a first magnetic field that additively combines with a second magnetic field caused by the surface current in the metal casing of the computing device 300.

When the power source supplies current to the wireless charging coil 302, the wireless charging coil 302 couples with the aperture 306 in the metal casing of the computing device. This coupling induces a surface current on the metal casing of the computing device 300 around the aperture 306. The induced surface current flowing around the aperture 306 takes the form of current loops centered around each of the sub-apertures of the aperture 306. Notably, the current flowing through the wireless charging coil 302 and the induced surface current flowing around the aperture 306 flow in the same direction.

The current flowing through the wireless charging coil 302 and the induced surface current flowing around the aperture 306 each cause a magnetic field perpendicular to the current flow. The magnetic field caused by the current flowing through the wireless charging coil 302 and the magnetic field caused by the induced surface current flowing around the aperture 306 are each disc shaped and go in the same direction. As a result, the magnetic field caused by the current flowing through the wireless charging coil 302 and the magnetic field caused by the induced surface current flowing around the aperture 306 additively combine to form a combined magnetic field. The combined magnetic field is also disc shaped and extends away from the computing device 300. The combined magnetic field may be used to charge the target electronic device located on the charging target side of the metal casing of the computing device 300. The combined magnetic field is discussed in more detail with respect to FIG. 4.

Figure 4:
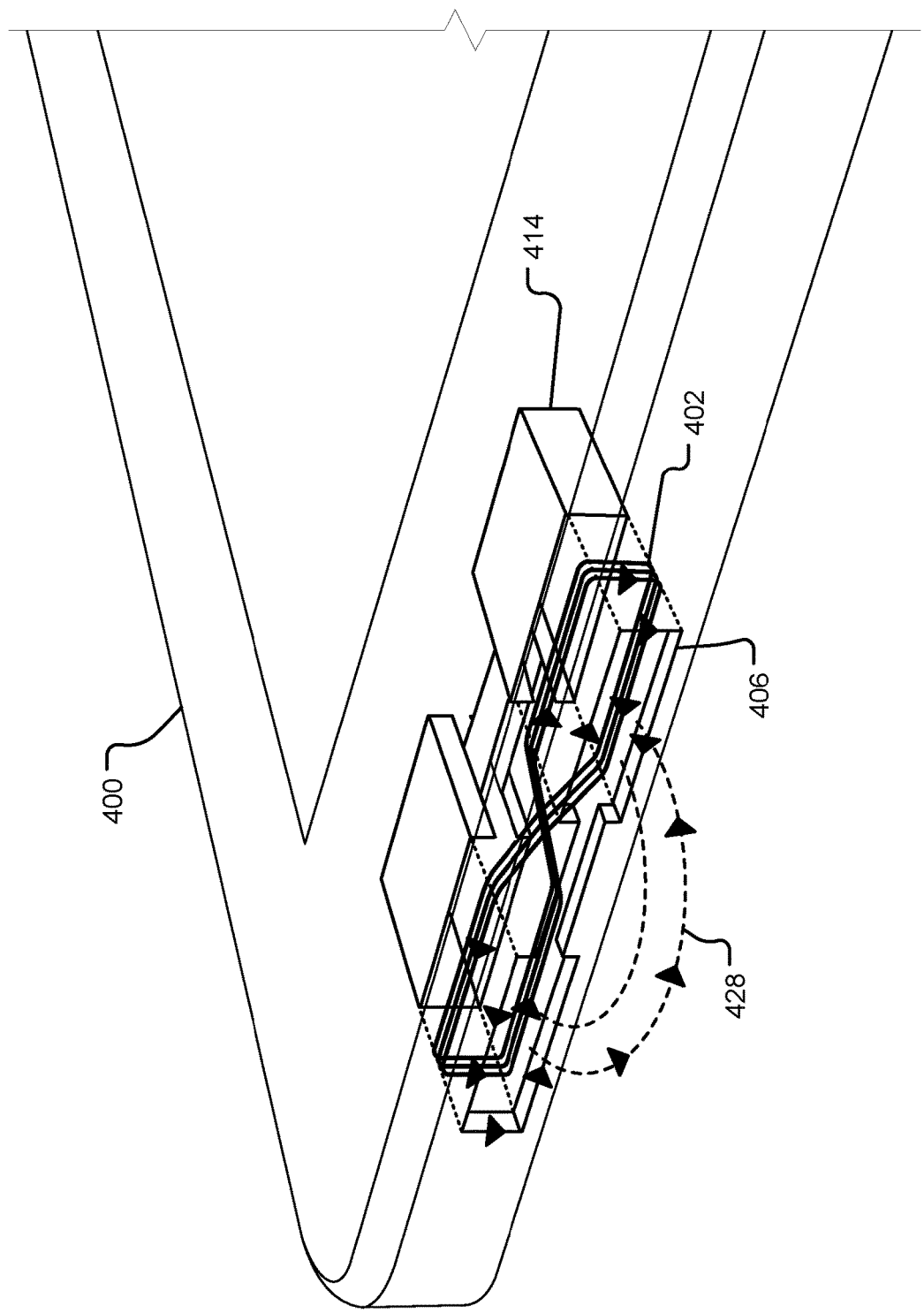
FIG. 4 illustrates an example computing device with a wireless charging coil and the magnetic field generated by the wireless charging coil.

FIG. 4 illustrates an example computing device 400 with a wireless charging coil 402 and a magnetic field 428 generated by the wireless charging coil 402. The computing device 400 includes a metal casing. The metal casing of the computing device 400 includes an aperture 406. The aperture 406 is formed from at least two sub-apertures and a channel connecting the two sub-apertures. The channel and the two sub-apertures all go completely through the metal casing of the computing device 400 to create the aperture 406. The aperture 406 may be any aperture in the metal casing of the computing device 400. In one implementation, the aperture 406 provides access to ports, such as USB ports, of the computing device 400.

The wireless charging coil 402 is aligned with the aperture 406 as shown. In some implementations, the aperture 406 provides access to ports of the computing device 400. Accordingly, the computing device 400 may also include a shield 414 for the ports. The wireless charging coil 402 is positioned such that the wireless charging coil does not prevent access to the ports accessed through the aperture 406. In some implementations, the wireless charging coil 402 is located between the aperture 406 and the shield 414, where the wireless charging coil 402 encircles at least a portion of the perimeter of the aperture 406 and the shield 414. In other implementations, the wireless charging coil 402 may be wrapped around the shield 414, where the perimeter of the shield 414 is aligned with the aperture 406.

The wireless charging coil 402 is connected to a current source (not shown) that provides current to the wireless charging coil 402. In some implementations, the wireless charging coil 402 may have its own current source that is not otherwise used by the computing device 400. In other implementations, the current source may be shared with other components in the computing device 400. When current flows through the charging coil 402 in the direction indicated by arrows on the charging coil 402 in FIG. 4, the charging coil 402 couples with the aperture 406 in the metal casing of the computing device 400. This coupling induces a surface current in the metal casing of the computing device 400 around the aperture 406 as indicated by arrows around the aperture 406 in FIG. 4. Though the aperture 406 is a single aperture, the induced surface current flows in two current loops, where each current loop is centered around the center of a sub-aperture of the aperture 406.

The surface currents surrounding the aperture 406 and the current flowing through the charging coil 402 each cause a magnetic field perpendicular to the plane of the current flow. Because of the direction of the current flow through the wireless charging coil 402 and the surface currents surrounding the aperture 406, each magnetic field flows perpendicularly out of one current loop and perpendicularly into the other current loop, forming a disc shape. Additionally, because the current flow through the wireless charging coil 402 and the surface currents surrounding the aperture 406 flow in the same direction, the magnetic field caused by the current flow through the wireless charging coil 402 additively combines with the magnetic field caused by the surface currents surrounding the aperture 406 to form a combined magnetic field 428.

The direction of the combined magnetic field 428 is the same as the magnetic field caused by the current flow through the wireless charging coil 402 and the magnetic field caused by the surface currents surrounding the aperture 406. For the current direction shown in FIG. 4, the combined magnetic field 428 has a direction indicated by arrows on the magnetic field 428. The combined magnetic field 428 has a sufficient amplitude to be used in wireless charging of target devices by the computing device 400.

Notably, as shown in FIG. 4, the surface currents surrounding the aperture 406 and the current flowing through the wireless charging coil 402 flow in the same direction. This direction of current flow is caused by the channel connecting the two sub-apertures of the aperture 406. Without the channel connecting the two sub-apertures of the aperture 406, each sub-aperture would be its own aperture and the surface currents surrounding the sub-apertures would flow in an opposite direction of the current flowing through the wireless charging coil 402. Accordingly, the surface currents surrounding the sub-apertures would cause a magnetic field in an opposing direction to the magnetic field caused by the current flowing through the wireless charging coil 402. Accordingly, the combined magnetic field would be weaker than the magnetic field caused by the current flowing through the wireless charging coil 402. In contrast, as described above, when a channel connects the two sub-apertures of the aperture 406, the magnetic field caused by the surface currents surrounding the aperture additively combines with the magnetic field caused by the current flowing through the wireless charging coil 402.

In FIG. 4, the two sub-apertures that form the aperture 406 are substantially the same size. Accordingly, the shield 414 and the wireless charging coil 402 are both substantially symmetrical. The current loops created by the current flowing the wireless charging coil 402 and the surface currents surrounding the aperture 406 are substantially equal in size, meaning that the combined magnetic field 428 has a uniform strength and is also substantially symmetrical. In some implementations, the sub-apertures are not substantially the same size. Accordingly, the combined magnetic field 428 is not even.

Figure 5:
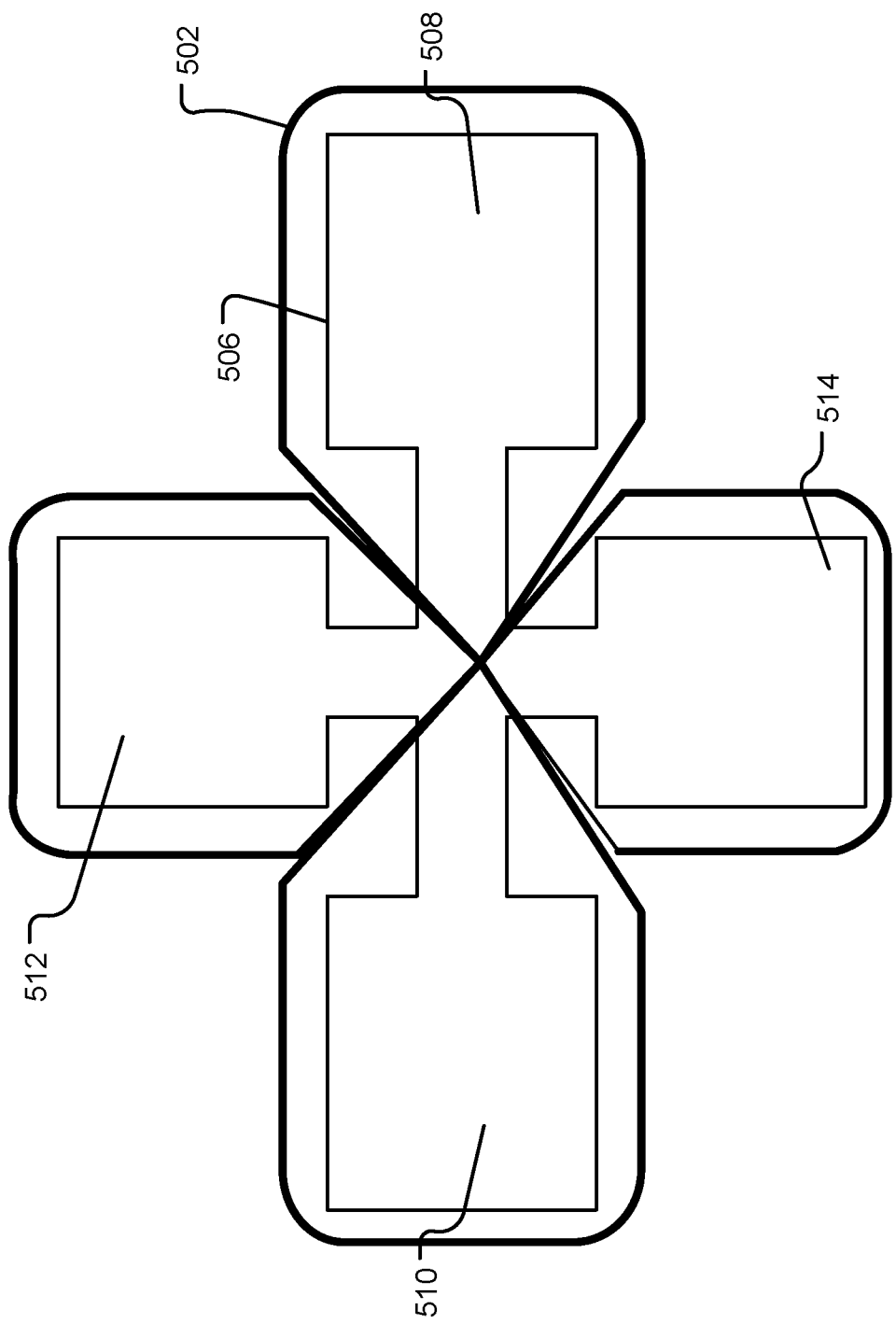
FIG. 5 illustrates another example wireless charging coil.

FIG. 5 illustrates another example wireless charging coil 502. The wireless charging coil 502 works with an aperture 506. The wireless charging coil 502 is located within an electronic device with a metal casing. The aperture 506 is an aperture in the metal casing of the electronic device. The aperture 506 includes four sub-apertures 508, 510, 512, and 514 connected by channels 516 and 518. In one implementation, the sub-apertures 508, 510, 512, and 514 each provide access to a port, such as a USB port, in the electronic device. In another implementation, the sub-apertures 508, 510, 512, and 514 may be apertures in the metal casing of the electronic device that exist for another reason, such as ventilation for the electronic device. The wireless charging coil 502 may not be one continuous coil. Instead a first sub-coil aligns with the sub-aperture 508 and 510 and a second sub-coil aligns with the sub-aperture 512 and the sub-aperture 514.

The wireless charging coil 502 may, in some implementations, be wrapped around a shield (not shown) acting as a shield for the ports accessed through the sub-aperture 508, the sub-aperture 510, the sub-aperture 512, and the sub-aperture 514. In other implementations, the wireless charging coil 502 may be located between a shield and a metal casing of the electronic device. In yet another implementation, there is no shield and the wireless charging coil 502 is substantially aligned with the perimeter of the aperture 506.

The wireless charging coil 502 is supplied with current using a current source. In the implementation shown in FIG. 5, the current source may supply current to both sub-coils of the wireless charging coil 502. When current is supplied to the wireless charging coil 502, the charging coil 502 couples with the aperture 506. This coupling causes an induced surface current in the metal casing of the electronic device flowing around the aperture 506 in the metal casing of the electronic device. The induced surface current takes the form of current loops that are centered around the sub-apertures 508, 510, 512, and 514. Notably, the induced surface current flowing around the aperture 506 flows in the same direction as the current flowing through the wireless charging coil 502.

The current flowing through the wireless charging coil 502 causes a magnetic field perpendicular to the current. For the configuration shown in FIG. 5, two separate magnetic fields are formed corresponding to the two sub-coils. For example, a first magnetic field may be shaped like a disc leaving the sub-aperture 510 and entering the sub-aperture 508. A second magnetic field may be shaped like a disc leaving the sub-aperture 514 and entering the sub-aperture 512. The direction of the magnetic fields caused by the current flowing through the wireless charging coil 502 depends on the direction of the current flowing through the wireless charging coil 502.

The surface current flowing around the aperture 506 also causes two magnetic fields. A third magnetic field may be shaped like a disc leaving the sub-aperture 510 and entering the sub-aperture 508. A fourth magnetic field may be shaped like a disc leaving the sub-aperture 514 and entering the sub-aperture 512. The third magnetic field goes in the same direction as the first magnetic field caused by the current flowing through the wireless charging coil 502. The fourth magnetic field goes in the same direction as the second magnetic field caused by the current flowing through the wireless charging coil 502.

The first magnetic field caused by the current flowing through the wireless charging coil 502 additively combines with the third magnetic field caused by the surface current flowing around the aperture 506 to form a first combined magnetic field. Similarly, the second magnetic field caused by the current flowing through the wireless charging coil 502 additively combines with the fourth magnetic field caused by the surface current flowing around the aperture 506 to form a second combined magnetic field. The first combined magnetic field and the second combined magnetic field may be used to charge a target electronic device using wireless charging.

Other configurations of apertures and charging coils are possible. For example, in one implementation, two apertures are aligned vertically, and a charging coil is aligned with each of the apertures. When the two apertures are similarly shaped and sized, this configuration effectively increases the area over which the combined magnetic field can charge a target device.

Figure 6:
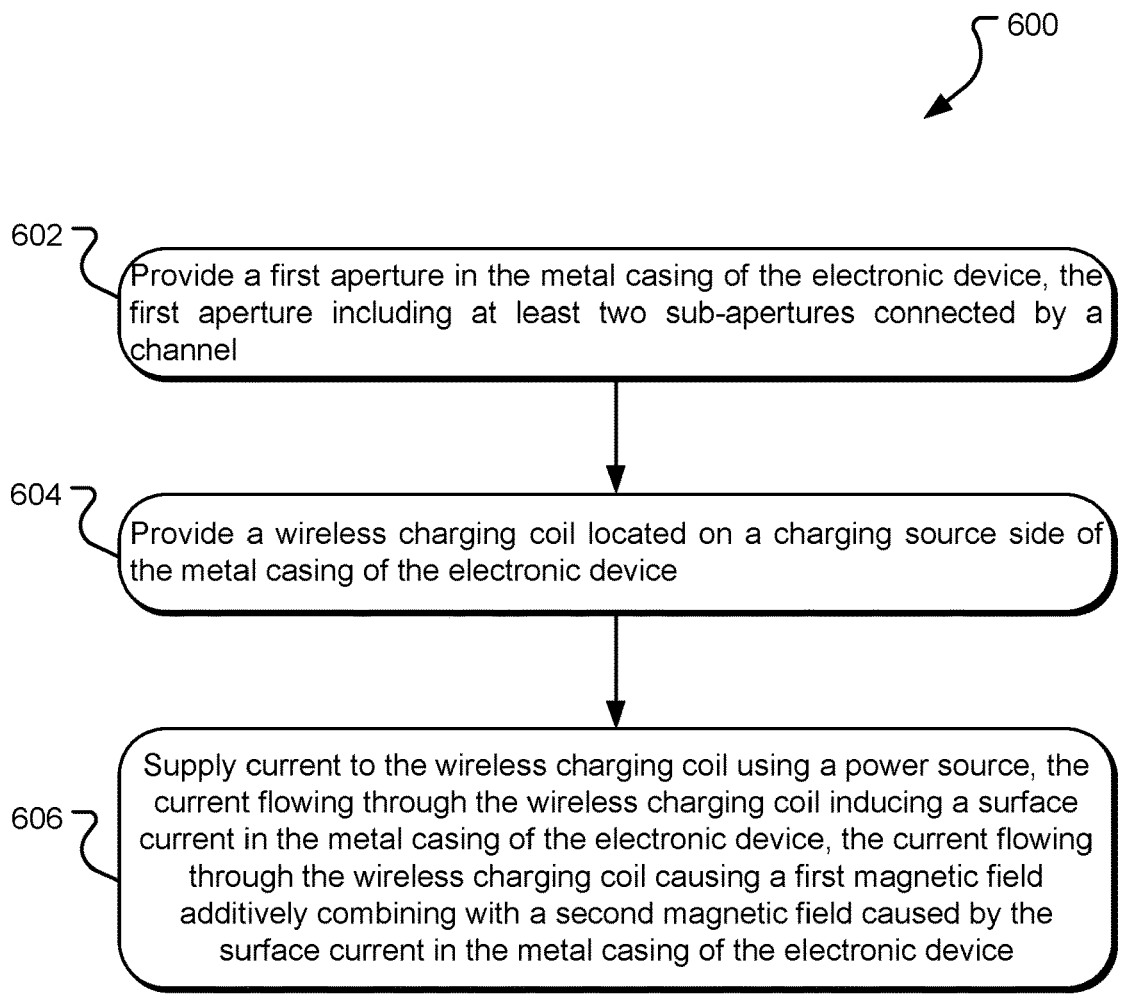
FIG. 6 illustrates example operations for charging a target electronic device using a wireless charging coil.

FIG. 6 illustrates example operations 600 for charging a target electronic device located on a charging target side of a metal casing of an electronic device using a wireless charging coil assembly. A first providing operation 602 provides a first aperture in a metal casing of an electronic device. The first aperture includes at least two sub-apertures connected by at least one channel. In some implementations, each of the two sub-apertures provide access to a port of the electronic device, such as USB ports. In other implementations, the sub-apertures may be other apertures in the metal casing of the electronic device that perform other functions, such as ventilation for the electronic device. The channel connects the sub-apertures such that the aperture is a single aperture in the metal casing of the electronic device.

A second providing operation 604 provides a wireless charging coil located on a charging source side of the metal casing of the electronic device. The wireless charging coil is substantially aligned with the perimeter of the aperture in the metal casing of the electronic device. For example, when the aperture provides access to ports of the electronic device, the wireless charging coil is aligned such that the wireless charging coil does not inhibit use of the ports accessed through the aperture. In some implementations, such as the implementation discussed with respect to FIG. 5, more than one wireless charging coil may be provided.

In some implementations, such as the implementation discussed with respect to FIG. 2, the wireless charging coil may be wrapped around a shield for the ports accessible through the aperture. In other implementations, such as the implementation discussed with respect to FIG. 3, the wireless charging coil may be located between a shield for the ports accessible through the aperture and the aperture. In yet another implementation, there may be no shield and the wireless charging coil may be located on the charging source side of the metal casing of the electronic device. In any implementation, the wireless charging coil is located close enough to the metal casing of the electronic device to couple with the aperture in the metal casing of the electronic device. The exact distance of the wireless charging coil from the metal casing of the electronic device may change depending on the design. In one implementation, the wireless charging coil is located at a distance of less than 1 mm from the metal casing of the electronic device.

A supplying operation 606 supplies current to the wireless charging coil using a power source. The current flowing through the wireless charging coil induces a surface current in the metal casing of the electronic device. The current flowing through the wireless charging coil causes a first magnetic field that additively combines with a second magnetic field caused by the surface current in the metal casing of the electronic device.

The wireless charging coil may be supplied by a power source in the electronic device that only powers the wireless charging coil. In another implementation, the power source may be shared with other components of the electronic device. When the power source supplies current to the wireless charging coil, the wireless charging coil couples with the aperture in the metal casing of the electronic device. This coupling induces a surface current on the metal casing of the electronic device around the aperture. The induced surface current flowing around the aperture takes the form of current loops centered around each of the sub-apertures of the aperture. Notably, the current flowing through the wireless charging coil and the induced surface current flowing around the aperture flow in the same direction.

The current flowing through the wireless charging coil and the induced surface current flowing around the aperture each cause a magnetic field perpendicular to the current flow. The magnetic field caused by the current flowing through the wireless charging coil and the magnetic field caused by the induced surface current flowing around the aperture are each disc shaped and go in the same direction. As a result, the magnetic field caused by the current flowing through the wireless charging coil and the magnetic field caused by the induced surface current flowing around the aperture additively combine to form a combined magnetic field. The combined magnetic field is also disc shaped and extends away from the electronic device. The combined magnetic field may be used to charge the target electronic device located on the charging target side of the metal casing of the electronic device.

Figure 7:
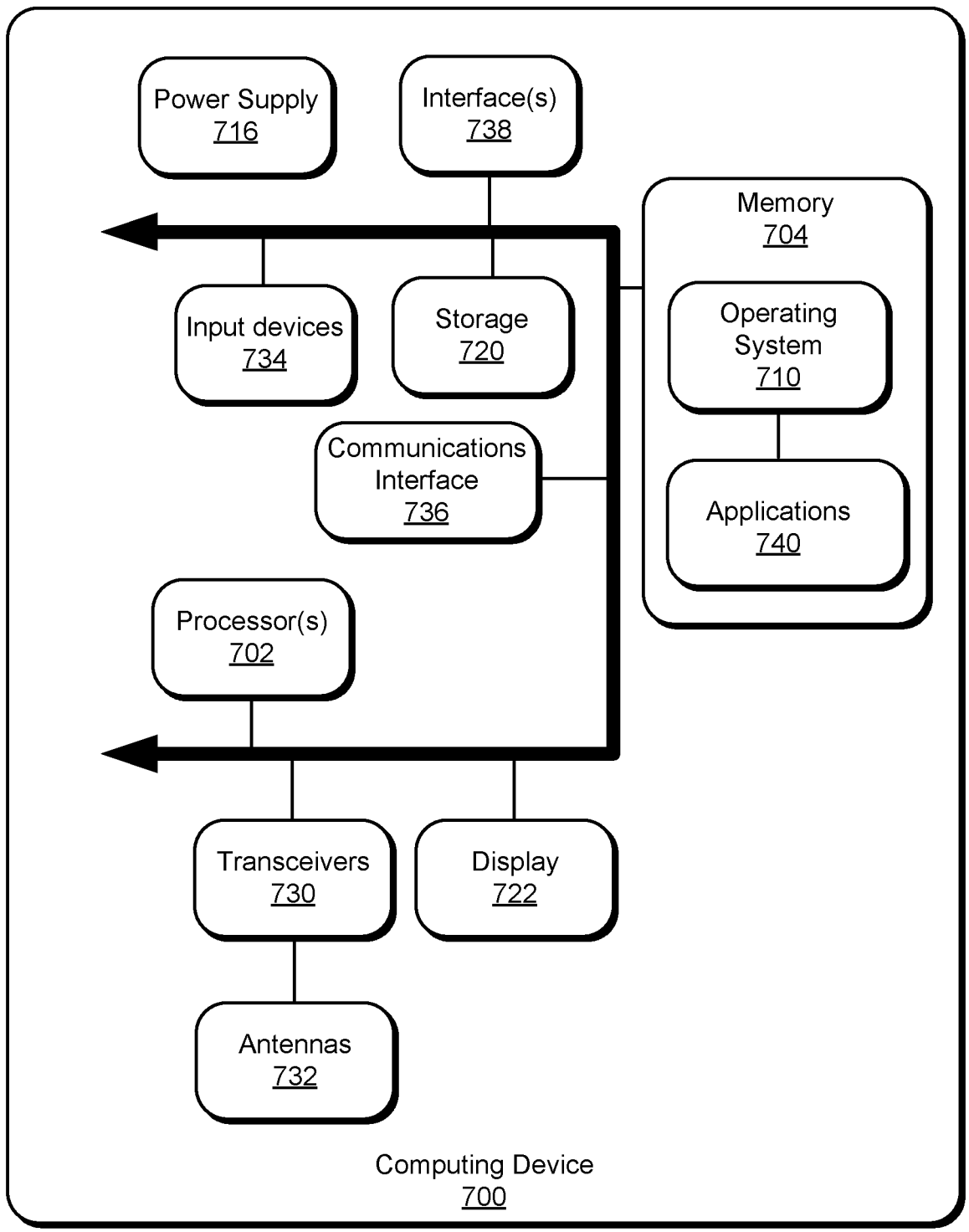
FIG. 7 illustrates an example computing device supporting the wireless charging coil.

FIG. 7 illustrates an example computing device supporting a wireless charging coil. The computing device 700 may be a client device, such as a laptop, mobile device, desktop, tablet, or a server/cloud device. The computing device 700 includes one or more processor(s) 702, and a memory 704. The memory 704 generally includes both volatile memory (e.g., RAM) and non-volatile memory (e.g., flash memory). An operating system 710 resides in the memory 704 and is executed by the processor(s) 702.

One or more application 740 are loaded into the operating system 710 on the memory 704 and/or storage 720 and executed by the processor(s) 702. The storage 720 may be local to the computing device 700 or may be remote and communicatively connected to the computing device 700 and may include another server. The storage 720 may store resources that are requestable by client devices (not shown).

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730 which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The one or more antennas 732 may include the structural slot antenna. The computing device 700 may further include a network adapter 736, which is a type of communication device. The computing device 700 may use the adapter and any other types of communication devices for establishing connections over a wide-area network (WAN) or local-area network (LAN). It should be appreciated that the network connections shown are exemplary and that other communications devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738 such as a serial port interface, parallel port, or universal serial bus (USB). The computing device 700 may further include a display 722 such as a touch screen display.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Figure 8:
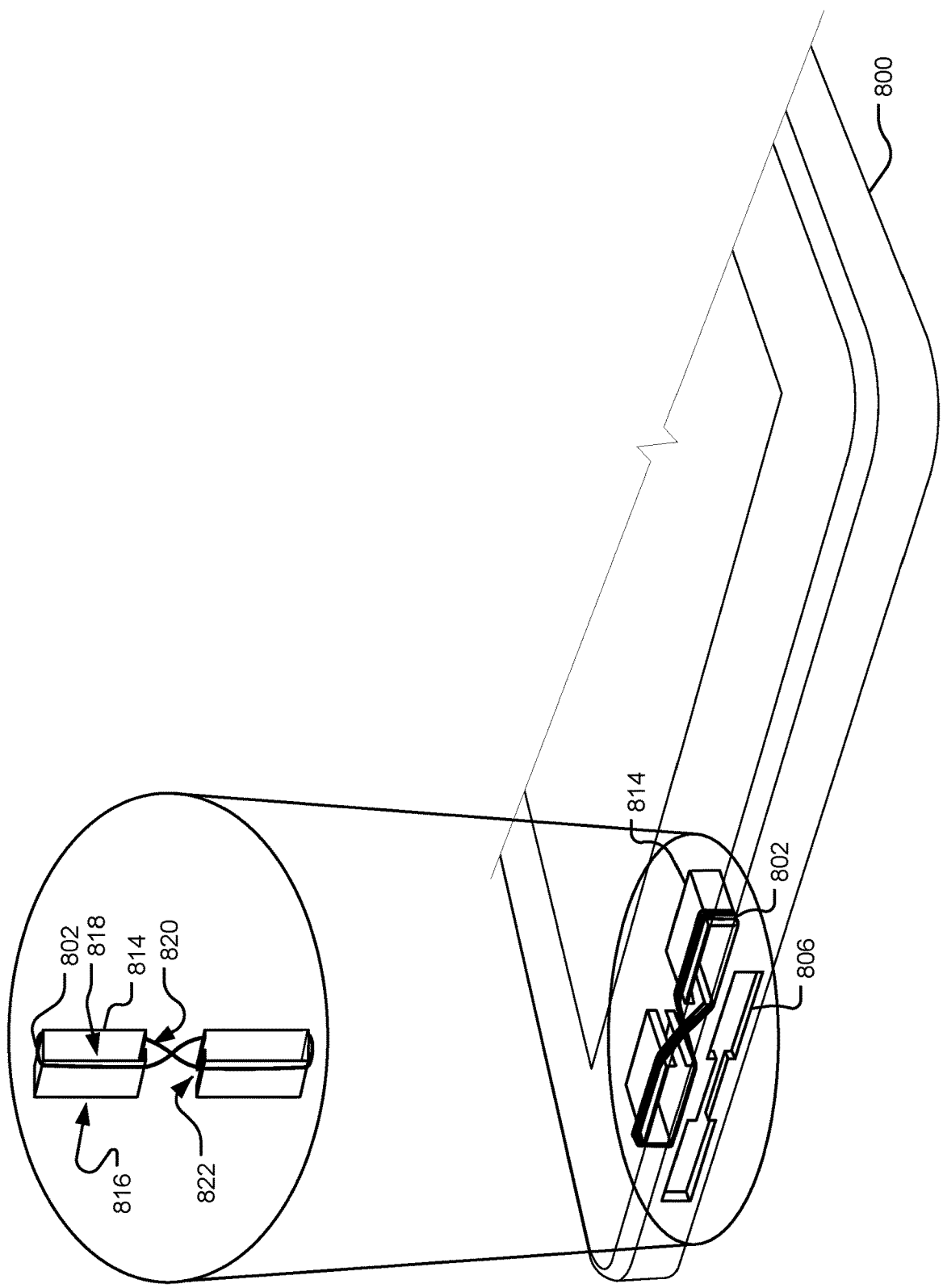
FIG. 8 illustrates an example computing device with a wireless charging coil.

FIG. 8 illustrates an example computing device 800 with a wireless charging coil 802. The computing device 800 is surrounded by a metal casing with an aperture 806 in the metal casing. As shown in FIG. 8, the aperture 806 provides access to two ports of the computing device 800. A shield 814 provides shielding for the ports accessed through the aperture 806. The shield 814 is formed from two open shields. Each open shield forming the shield 814 has an open front face, an open back face, and a partially open inner side. For example, an arrow 818 indicates an open front face and an arrow 816 indicates an open back face. Arrows 820 and 822 indicate the partially open inner sides of each of the open shields forming the shield 814. In some implementations, the outer sides of each of the open shields may also be partially open.

An example electronic device is provided. The electronic device includes one or more electronic components. The electronic device also includes a metal casing surrounding the one or more electronic components of the electronic device. The metal casing has a first aperture formed in the metal casing. The first aperture includes at least two sub-apertures connected by a channel, an exterior surface on a charging target side of the metal casing, and an interior surface on a charging source side of the metal casing. The electronic device also includes a wireless charging coil including at least two sub-loops located on the charging source side of the metal casing of the electronic device. The wireless charging coil is supplied with current. The current flowing through the wireless charging coil induces a surface current about the first aperture in the metal casing. The current flowing through the wireless charging coil and the surface current flow in the same direction and cause a combined magnetic field that exceeds the magnitude of a magnetic field caused by the current flowing through the wireless charging coil and exceeds the magnitude of a magnetic field caused by the surface current.

An electronic device of any previous electronic device is provided where the at least two sub-loops of the wireless charging coil are aligned with the at least two sub-apertures in the first aperture along an axis perpendicular to the metal casing.

An electronic device of any previous electronic device is provided where the first aperture provides ventilation for the electronic device.

An electronic device of any previous electronic device is provided where the first aperture is shaped to provide access to at least two ports in the electronic device.

An electronic device of any previous electronic device is provided where each of the sub-loops of the wireless charging coil encircles one of the at least two ports in the electronic device.

An electronic device of any previous electronic device is provided where the wireless charging coil is wrapped around a shield of the at least two ports in the electronic device.

An electronic device of any previous electronic device is provided where the wireless charging coil is located between the metal casing of the electronic device and a shield of the at least two ports in the electronic device.

A wireless charging coil assembly is provided. The wireless charging coil assembly includes a planar metal element. The planar metal element includes a first aperture including at least two sub-apertures connected by a channel formed in the planar metal element. The planar metal element further includes an exterior surface on a charging target side of the planar metal element and an interior surface on a charging source side of the planar metal element. The wireless charging coil assembly also includes a wireless charging coil including at least two sub-loops located on the charging source side of the planar metal element. The wireless charging coil is supplied with current. The current flowing through the wireless charging coil induces a surface current about the first aperture in the planar metal element. The current flowing through the wireless charging coil and the surface current flow in the same direction and cause a combined magnetic field that exceeds the magnitude of a magnetic field caused by the current flowing through the wireless charging coil and exceeds the magnitude of a magnetic field caused by the surface current.

A wireless charging coil assembly of any previous wireless charging coil assembly is provided, where the at least two sub-loops of the wireless charging coil are aligned with the at least two sub-apertures in the first aperture along an axis perpendicular to the planar metal element.

A wireless charging coil assembly of any previous wireless charging coil assembly is provided, where the first aperture provides ventilation for an electronic device.

A wireless charging coil assembly of any previous wireless charging coil assembly is provided, where the first aperture is shaped to provide access to at least two ports in an electronic device.

A wireless charging coil assembly of any previous wireless charging coil assembly is provided, where each of the sub-loops of the wireless charging coil encircles one of the at least two ports in the electronic device.

A wireless charging coil assembly of any previous wireless charging coil assembly is provided, where the wireless charging coil is wrapped around a shield of the at least two ports in the electronic device.

A wireless charging coil assembly of any previous wireless charging coil assembly is provided, where the shield of the at least two ports in the electronic device is formed by two open shields connected by a channel.

A wireless charging coil assembly of any previous wireless charging coil assembly is provided, where the shield of the at least two ports in the electronic device is formed by two open shields.

A wireless charging coil assembly of any previous wireless charging coil assembly is provided, where the wireless charging coil is located between the planar metal element and a shield of the at least two ports in the electronic device.

A method for charging a target electronic device located on a charging target side of a metal casing of an electronic device including one or more electronic components using a wireless charging coil assembly is provided. The method includes providing a first aperture in the metal casing of the electronic device. The first aperture includes at least two sub-apertures connected by a channel formed in the metal casing of the electronic device. The method also includes providing a wireless charging coil including at least two sub-loops located on an exterior charging source side of the metal casing of the electronic device. The method further includes supplying current to the wireless charging coil. The current flowing through the wireless charging coil induces a surface current in the metal casing of the electronic device about the first aperture in the metal casing. The current flowing through the wireless charging coil causes a first magnetic field additively combining with a second magnetic field caused by the surface current in the metal casing of the electronic device to form a combined magnetic field that exceeds the magnitude of the first magnetic field and the second magnetic field.

A method of any previous method is provided, where the at least two sub-loops of the wireless charging coil are aligned with the at least two sub-apertures in the first aperture along an axis perpendicular to the metal casing of the electronic device.

A method of any previous method is provided, where the wireless charging coil is wrapped around a shield of at least two ports in the electronic device accessible via the first aperture.

A method of any previous method is provided, where the wireless charging coil is located between the metal casing of the electronic device and a shield of at least two ports in the electronic device accessible via the first aperture.

A system for charging a target electronic device located on a charging target side of a metal casing of an electronic device including one or more electronic components using a wireless charging coil assembly is provided. The system includes means for providing a first aperture in the metal casing of the electronic device. The first aperture includes at least two sub-apertures connected by a channel formed in the metal casing of the electronic device. The system also includes means for providing a wireless charging coil including at least two sub-loops located on an exterior charging source side of the metal casing of the electronic device. The system further includes means for supplying current to the wireless charging coil. The current flowing through the wireless charging coil induces a surface current in the metal casing of the electronic device about the first aperture in the metal casing. The current flowing through the wireless charging coil causes a first magnetic field additively combining with a second magnetic field caused by the surface current in the metal casing of the electronic device to form a combined magnetic field that exceeds the magnitude of the first magnetic field and the second magnetic field.

A system of any previous system is provided, where the at least two sub-loops of the wireless charging coil are aligned with the at least two sub-apertures in the first aperture along an axis perpendicular to the metal casing of the electronic device.

A system of any previous system is provided, where the wireless charging coil is wrapped around a shield of at least two ports in the electronic device accessible via the first aperture.

A system of any previous system is provided, where the wireless charging coil is located between the metal casing of the electronic device and a shield of at least two ports in the electronic device accessible via the first aperture.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. An electronic device including one or more electronic components, the electronic device comprising:
   a metal casing surrounding the one or more electronic components of the electronic device, the metal casing having a first aperture formed in the metal casing, the first aperture including at least two sub-apertures connected by a channel formed in the metal casing, the metal casing further including an exterior surface on a charging target side of the metal casing and an interior surface on a charging source side of the metal casing; and
   a wireless charging coil including at least two sub-loops located on the charging source side of the metal casing of the electronic device, the wireless charging coil being supplied with current, the current flowing through the wireless charging coil inducing a surface current about the first aperture in the metal casing, the current flowing through the wireless charging coil and the surface current flowing in the same direction causing a combined magnetic field that exceeds the magnitude of a magnetic field caused by the current flowing through the wireless charging coil and exceeds the magnitude of a magnetic field caused by the surface current.

2. The electronic device of claim 1, wherein the at least two sub-loops of the wireless charging coil are aligned with the at least two sub-apertures in the first aperture along an axis perpendicular to the metal casing.

3. The electronic device of claim 1, wherein the first aperture provides ventilation for the electronic device.

4. The electronic device of claim 1, wherein the first aperture is shaped to provide access to at least two ports in the electronic device.

5. The electronic device of claim 4, wherein each of the sub-loops of the wireless charging coil encircles one of the at least two ports in the electronic device.

6. The electronic device of claim 5, wherein the wireless charging coil is wrapped around a shield of the at least two ports in the electronic device.

7. The electronic device of claim 5, wherein the wireless charging coil is located between the metal casing of the electronic device and a shield of the at least two ports in the electronic device.

8. A wireless charging coil assembly comprising:
   a planar metal element, the planar metal element including a first aperture formed in the planar metal element, the first aperture including at least two sub-apertures connected by a channel formed in the planar metal element, the planar metal element further including an exterior surface on a charging target side of the planar metal element and an interior surface on a charging source side of the planar metal element; and a wireless charging coil including at least two sub-loops located on the charging source side of the planar metal element, the wireless charging coil being supplied with current, the current flowing through the wireless charging coil inducing a surface current about the first aperture in the planar metal element, the current flowing through the wireless charging coil and the surface current flowing in the same direction causing a combined magnetic field that exceeds the magnitude of a magnetic field caused by the current flowing through the wireless charging coil and exceeds the magnitude of a magnetic field caused by the surface current.

9. The wireless charging coil assembly of claim 8, wherein the at least two sub-loops of the wireless charging coil are aligned with the at least two sub-apertures in the first aperture along an axis perpendicular to the planar metal element.

10. The wireless charging coil assembly of claim 8, wherein the first aperture provides ventilation for an electronic device.

11. The wireless charging coil assembly of claim 8, wherein the first aperture is shaped to provide access to at least two ports in an electronic device.

12. The wireless charging coil assembly of claim 11, wherein each of the sub-loops of the wireless charging coil encircles one of the at least two ports in the electronic device.

13. The electronic device of claim 12, wherein the wireless charging coil is wrapped around a shield of the at least two ports in the electronic device.

14. The electronic device of claim 13, wherein the shield of the at least two ports in the electronic device is formed by two open shields connected by a channel.

15. The electronic device of claim 13, wherein the shield of the at least two ports in the electronic device is formed by two open shields.

16. The electronic device of claim 12, wherein the wireless charging coil is located between the planar metal element and a shield of the at least two ports in the electronic device.

17. A method for charging a target electronic device located on a charging target side of a metal casing of an electronic device including one or more electronic components using a wireless charging coil assembly, the method comprising:

providing a first aperture formed in the metal casing of the electronic device, the first aperture including at least two sub-apertures connected by a channel formed in the metal casing of the electronic device;

providing a wireless charging coil including at least two sub-loops located on an exterior charging source side of the metal casing of the electronic device;

supplying current to the wireless charging coil, the current flowing through the wireless charging coil inducing a surface current in the metal casing of the electronic device about the first aperture in the metal casing, the current flowing through the wireless charging coil causing a first magnetic field additively combining with a second magnetic field caused by the surface current in the metal casing of the electronic device to form a combined magnetic field that exceeds the magnitude of the first magnetic field and the second magnetic field.

18. The method of claim 17, wherein the at least two sub-loops of the wireless charging coil are aligned with the at least two sub-apertures in the first aperture along an axis perpendicular to the metal casing of the electronic device.

19. The method of claim 17, wherein the wireless charging coil is wrapped around a shield of at least two ports in the electronic device accessible via the first aperture.

20. The method of claim 17, wherein the wireless charging coil is located between the metal casing of the electronic device and a shield of at least two ports in the electronic device accessible via the first aperture.

* * * * *